(12) United States Patent
Yamaue et al.

(10) Patent No.: US 8,980,038 B2
(45) Date of Patent: Mar. 17, 2015

(54) METHOD FOR PRODUCING MEMBRANE ELECTRODE ASSEMBLY

(71) Applicant: Toyota Jidosha Kabushiki Kaisha, Toyota-shi (JP)

(72) Inventors: Keita Yamaue, Susono (JP); Shigeaki Murata, Numadu (JP); Masahiro Imanishi, Gotenba (JP); Shigeki Hasegawa, Syuntō-gun (JP); Ryoichi Nanba, Susono (JP); Kyohei Kadota, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 14/356,267

(22) PCT Filed: Nov. 1, 2012

(86) PCT No.: PCT/JP2012/078382
§ 371 (c)(1),
(2) Date: May 5, 2014

(87) PCT Pub. No.: WO2013/069543
PCT Pub. Date: May 16, 2013

(65) Prior Publication Data
US 2014/0318696 A1    Oct. 30, 2014

(30) Foreign Application Priority Data

Nov. 7, 2011    (JP) .................................. 2011-243485

(51) Int. Cl.
*H01M 8/10* (2006.01)
*H01M 4/86* (2006.01)
*H01M 4/96* (2006.01)
*H01M 4/88* (2006.01)
*H01M 8/02* (2006.01)

(52) U.S. Cl.
CPC ............ *H01M 8/1004* (2013.01); *Y02E 60/521* (2013.01); *H01M 4/8605* (2013.01); *H01M 4/96* (2013.01); *H01M 4/8814* (2013.01); *H01M 8/0234* (2013.01)
USPC .......................................... 156/231; 156/238

(58) Field of Classification Search
None
See application file for complete search history.

(56) References Cited

U.S. PATENT DOCUMENTS 6,059,913 A * 5/2000 Asmussen et al. ............ 156/230
2013/0020280 A1    1/2013 Hasegawa et al.

FOREIGN PATENT DOCUMENTS

JP    2009-129614 A    6/2009
JP    2009-230964 A    10/2009

(Continued)

*Primary Examiner* — Barbara J Musser
(74) *Attorney, Agent, or Firm* — Kenyon & Kenyon LLP

(57) ABSTRACT

An object of the present invention is to provide a method for producing a membrane electrode assembly with excellent electrode transfer ability to electrolyte membrane. Disclosed is a method for producing a membrane electrode assembly, the assembly comprising an electrolyte membrane and an electrode which are attached to each other, the method comprising: a hot pressing step in which an electrolyte membrane and an electrode, the electrode comprising an electroconductive material and an electrolyte resin and being formed on a flexible substrate, are hot pressed to produce a laminate in which the electrolyte membrane, the electrode and the flexible substrate are laminated in this order, and a bending step in which the laminate is bent so that the flexible substrate side becomes concave, thereby removing the flexible substrate from the electrode.

4 Claims, 5 Drawing Sheets

(56) References Cited

FOREIGN PATENT DOCUMENTS

| | | | |
|---|---|---|---|
| JP | 2010-267582 | A | 11/2010 |
| JP | 2010-272437 | A | 12/2010 |
| JP | 2011-129426 | A | 6/2011 |
| JP | 2011-222378 | A | 11/2011 |
| JP | 2011-222444 | A | 11/2011 |

* cited by examiner (2A)

(2B)    (2C)

METHOD FOR PRODUCING MEMBRANE ELECTRODE ASSEMBLY

CROSS-REFERENCE TO RELATED APPLICATIONS

This is a national phase application based on the PCT International Patent Application No. PCT/JP2012/078382 filed on Nov. 1, 2012, claiming priority to Japanese application No. 2011-243485 filed Nov. 7, 2011, the entire contents of both of which are incorporated herein by reference.

TECHNICAL FIELD

The present invention relates to a method for producing a membrane electrode assembly, comprising a step of transferring an electrode to an electrolyte membrane.

BACKGROUND ART

In fuel cells, a fuel and an oxidant are supplied to two electrically-connected electrodes to electrochemically oxidize the fuel, thereby converting chemical energy directly to electrical energy. Unlike thermal power generation, fuel cells are not limited by the Carnot cycle; therefore, they show high energy conversion efficiency. A fuel cell generally comprises a stack of fuel cells, each having an electrolyte layer sandwiched by a pair of electrodes as the basic structure, i.e., a membrane-electrode assembly as the basic structure.

Electrodes provided on both surfaces of an electrolyte membrane generally comprise an electroconductive material and an electrolyte resin (ionomer), the electroconductive material carrying a catalyst. An electrode can be attached to an electrolyte membrane by the following methods, for example: (1) a method of applying an electrode ink to a surface of an electrolyte membrane and drying the same, the ink comprising a catalyst-carrying electroconductive material and an electrolyte resin; and (2) a method of transferring an electrode to an electrolyte membrane by hot pressing, the electrode comprising a catalyst-carrying electroconductive material and an electrolyte resin.

Concrete examples of the above method (2) include those disclosed Patent Literatures 1 to 3.

For example, the method disclosed in Patent Literature 1 is a method for producing a membrane electrode assembly, comprising a step of transferring a catalyst electrode to at least one surface of an electrolyte membrane, the catalyst electrode comprising carbon nanotubes and an ionomer and being formed on a substrate.

CITATION LIST

Patent Literature 1: Japanese Patent Application Laid-Open (JP-A) No. 2010-272437
Patent Literature 2: JP-A No. 2010-267582
Patent Literature 3: JP-A No. 2011-129426

SUMMARY OF INVENTION

Technical Problem

The method as disclosed in Patent Literature 1 has such a problem that, when removing a substrate, an electrode cannot be removed from the substrate and forms a region where the electrode cannot be transferred to an electrolyte membrane. Such a poor transfer is one of the causes of decrease in yield.

Also, such a poor transfer is likely to occur especially when carbon nanotubes (CNTs) grown on a substrate surface are allowed to carry a catalyst and coated with an electrolyte resin to form an electrode and to use the substrate also as an electrode transfer substrate. This is due to a high adhesion between the CNTs and the substrate.

The present invention was achieved in light of the above circumstances. An object of the present invention is to provide a method for producing a membrane electrode assembly with excellent electrode transfer ability to electrolyte membrane.

Solution to Problem

The method for producing a membrane electrode assembly according to the present invention, comprises an electrolyte membrane and an electrode which are attached to each other, the method comprising: a hot pressing step in which an electrolyte membrane and an electrode, the electrode comprising an electroconductive material and an electrolyte resin and being formed on a flexible substrate, are hot pressed to produce a laminate in which the electrolyte membrane, the electrode and the flexible substrate are laminated in this order, and a bending step in which the laminate is bent so that the flexible substrate side becomes concave, thereby removing the flexible substrate from the electrode.

In the method for producing the membrane electrode assembly according to the present invention, the electrode can be removed from the flexible substrate by generating stress at the junction of the electrode and the flexible substrate, by the bending treatment performed in the bending step.

In the method for producing the membrane electrode assembly according to the present invention, in the bending step, the laminate is preferably bent in a condition which gives the flexible substrate a bending strain of 0.5% or more, the bending strain being represented by the following formula (1):

$$\epsilon = t/2R \times 100\% \qquad \text{Formula (1)}$$

t=Thickness of flexible substrate
R=Curvature radius of flexible substrate
This is because a sufficient stress can be applied to an interface between the electrode and the flexible substrate, and generation of poor transfer can be inhibited more reliably.

In the method for producing the membrane electrode assembly according to the present invention, carbon nanotubes grown on the flexible substrate can be used as the electroconductive material.

Also in the production method of the present invention, carbon nanotubes aligned in an approximately vertical direction on the flexible substrate can be used as the electroconductive material.

Concrete embodiments of the method for producing the membrane electrode assembly according to the present invention, include an embodiment in which the flexible substrate comprises a metal material and has a thickness of 1 to 500 μm, and the curvature radius R of the flexible substrate is 1 to 10 μm in the bending step.

Advantageous Effects of Invention

The method for producing the membrane electrode assembly according to the present invention, can inhibit the occurrence of poor electrode transfer to the electrolyte membrane, even in the region where the adhesion between the electrode and the substrate is high. Also, the production method of the present invention can inhibit poor electrode transfer even when a small hot press pressure (transfer pressure) is applied to the electrolyte membrane and the electrode, so that the production method can maintain the structure of the electrode on the substrate, even after transferring the electrode.

DESCRIPTION OF EMBODIMENTS

The method for producing a membrane electrode assembly according to the present invention, comprises an electrolyte membrane and an electrode which are attached to each other, the method comprising: a hot pressing step in which an electrolyte membrane and an electrode, the electrode comprising an electroconductive material and an electrolyte resin and being formed on a flexible substrate, are hot pressed to produce a laminate in which the electrolyte membrane, the electrode and the flexible substrate are laminated in this order, and a bending step in which the laminate is bent so that the flexible substrate side becomes concave, thereby removing the flexible substrate from the electrode.

Figure 1:
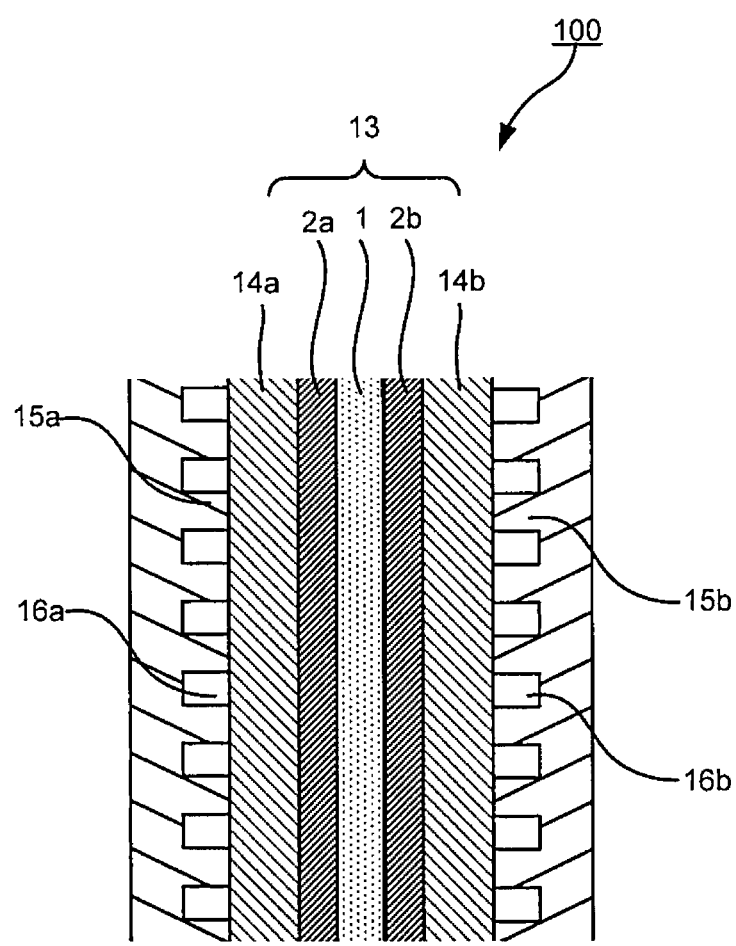
FIG. 1 is a schematic sectional view showing an embodiment of a fuel cell comprising a membrane electrode assembly produced by the production method of the present invention.

FIG. 1 is a schematic sectional view showing an embodiment of the fuel cell comprising a membrane electrode assembly produced by the production method of the present invention.

In FIG. 1, a unit fuel cell 100 comprises a membrane electrode assembly 13 in which a fuel electrode (anode) 2a is provided on a first surface of a solid polymer electrolyte membrane 1, while an oxidant electrode (cathode) 2b is provided on a second surface of the same. The membrane electrode assembly 13 is sandwiched by a fuel cell-side gas diffusion layer 14a and an oxidant electrode-side gas diffusion layer 14b and further by two separators 15a and 15b, thus constituting the unit cell 100. In each of the separators 15a and 15b, grooves are formed to form channels for the flow of reaction gases (fuel gas and oxidant gas). By the grooves and the gas diffusion layers 14a and 14b, channels 16a and 16b are defined to supply/emit the reaction gases.

The membrane electrode assembly provided by the present invention is not limited to the embodiment shown in FIG. 1. For example, the electrodes can have a monolayer structure or multilayer structure.

In this Description, the present invention will be described mainly on the membrane electrode assembly for fuel cells. However, the method for producing the membrane electrode assembly according to the present invention, can be used as the method for producing not only a membrane electrode assembly for fuel cells but for producing a membrane electrode assembly for other types of batteries.

Figure 9:
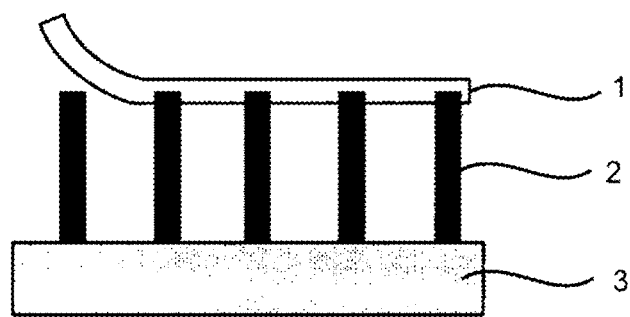
FIG. 9 is a schematic view showing the mechanism of poor transfer generation in conventional production methods.

The membrane electrode assembly as shown in FIG. 1 can be produced by hot pressing an electrolyte membrane and an electrode formed on a transfer substrate, and then removing the substrate to transfer the electrode onto the electrolyte membrane. However, when removing the substrate, as shown in FIG. 9, in the region where the adhesion between a substrate 3 and an electrode 2 is higher than the adhesion between the electrode 2 and an electrolyte membrane 1, the electrode 2 is removed from the electrolyte membrane 1 to cause poor transfer.

As a means for solving this problem, it is considered to increase heating temperature or pressure, which is applied upon the hot pressing, in order to increase the adhesion between the electrode and the electrolyte membrane higher than the adhesion between the electrode and the substrate. However, there is such a problem that a change in electrode structure, a heat deterioration in the electrolyte membrane and in the electrolyte resin component covering the surface of the electrode, an excessive ingrowth of the electrode into the electrolyte membrane, etc., are likely to occur.

In the present invention, the laminate obtained by hot pressing the electrolyte membrane and the electrode formed on the substrate, is bent so that the substrate side becomes convex, thereby deforming the substrate. A sheer stress is generated thereby at the junction of the electrode and the substrate, which functions to remove the substrate from the electrode. As a result, the substrate can be removed from the electrode, without removing the electrolyte membrane from the electrode. This removal mechanism will be described in more detail, by way of FIG. 2.

Figure 2:
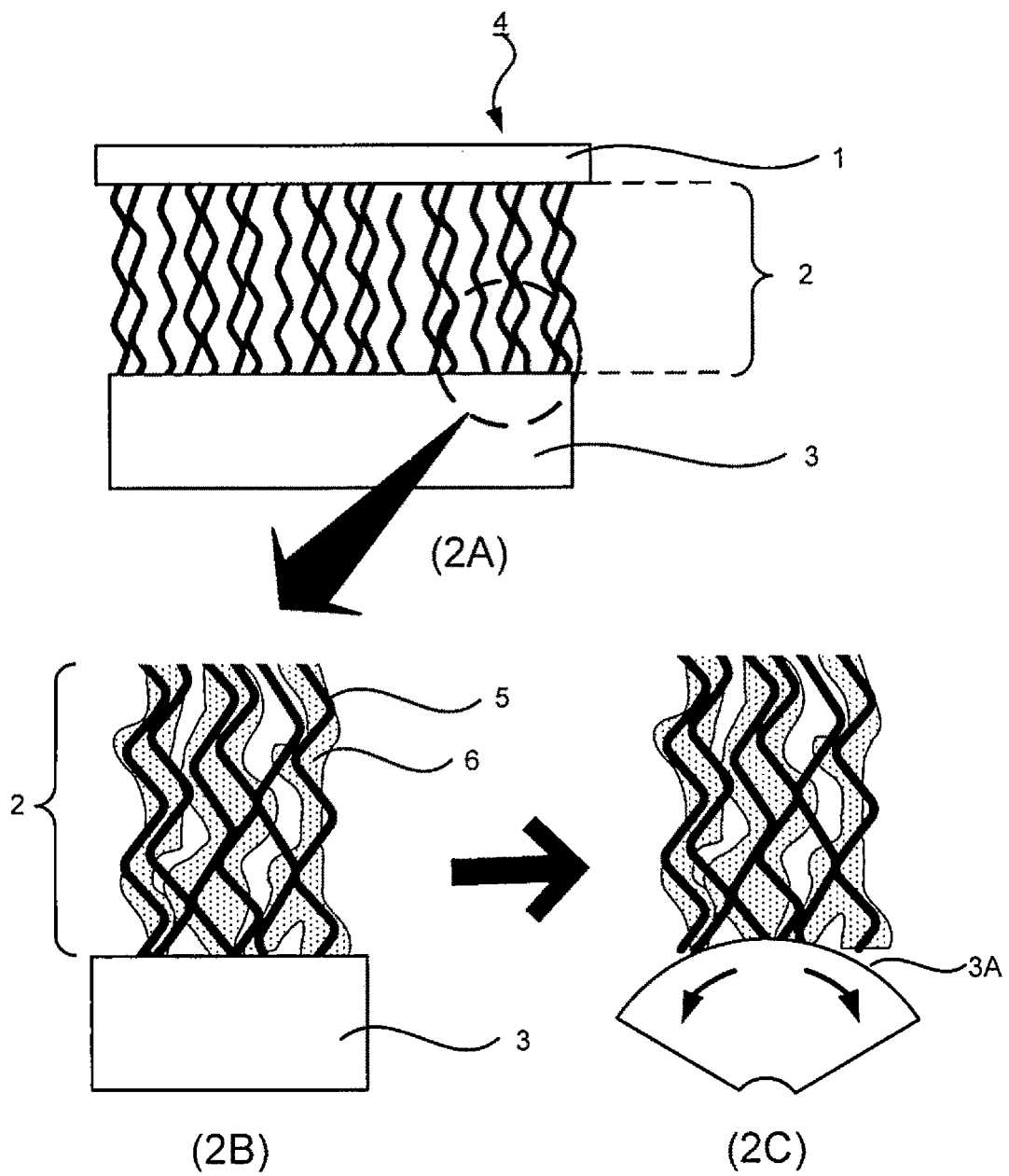
FIG. 2 is a schematic view illustrating the mechanism for removing the flexible substrate in the production method of the present invention.

FIG. 2 includes the following: a schematic sectional view (2A) of a laminate 4 produced by hot pressing the electrolyte membrane 1 and the electrode 2 formed on the flexible substrate 3; a partial enlarged view (2B) of the laminate 4; and an enlarged schematic sectional view (2C) of the laminate 4 when it is bent. In FIG. 2, the electrode 2 comprises carbon nanotubes (CNTs) 5 grown on the flexible substrate 3 and aligned in an approximately vertical direction, and an electrolyte resin 6 covering the surface of the CNTs 5.

As shown in the partial enlarged view (2B), in the CNT layer comprising the CNTs 5, the CNTs 5 are in such a state that the adjacent CNTs 5 interfere with each other and by the electrolyte resin 6 present between the adjacent CNTs 5. The interference is particularly strong in the region where the CNTs 5 are densely present.

As shown in the enlarged schematic sectional view (2C), when the laminate 4 is bent so that the flexible substrate 3 side becomes convex (depressed), a bending strain $\epsilon$ is generated at a surface 3A of the flexible substrate 3, which is an electrode-side surface joining to the electrode 2. On the other hand, at the electrode 2, the CNTs 5 are restrained by the interference between the CNTs or by the interference of the electrolyte resin 6, so that a strain is less likely to occur by the bending. As just described, when there is a difference between the strain of the electrode 2 and the strain of the flexible substrate 3 which is generated by the bending of the laminate 4, the electrode 2 cannot follow the strain of the flexible substrate 3. Therefore, a sheer stress $\tau$ is generated at the junction of the flexible substrate 3 and the electrode 2. The sheer stress $\tau$ functions as a force to remove the flexible substrate 3 from the electrode 2 and promotes the removal of the flexible substrate 3 from the electrode 2. When the sheer stress $\tau$ exceeds the adhesion between the electrode 2 and the flexible substrate 3, the flexible substrate 3 is naturally removed from the electrode 2. At the time of bending the laminate 4, since the electrode 2 is present between the flexible substrate 3 and the electrolyte membrane 1, there is no large difference in strain between the electrolyte membrane 1 and the electrode 2, and a sheer stress that can lead to the removal of the electrode 2 from the electrolyte membrane 1, is not generated at the junction thereof.

Therefore, by the bending of the laminate 4, only the flexible substrate 3 can be removed from the laminate 4.

Figure 3:
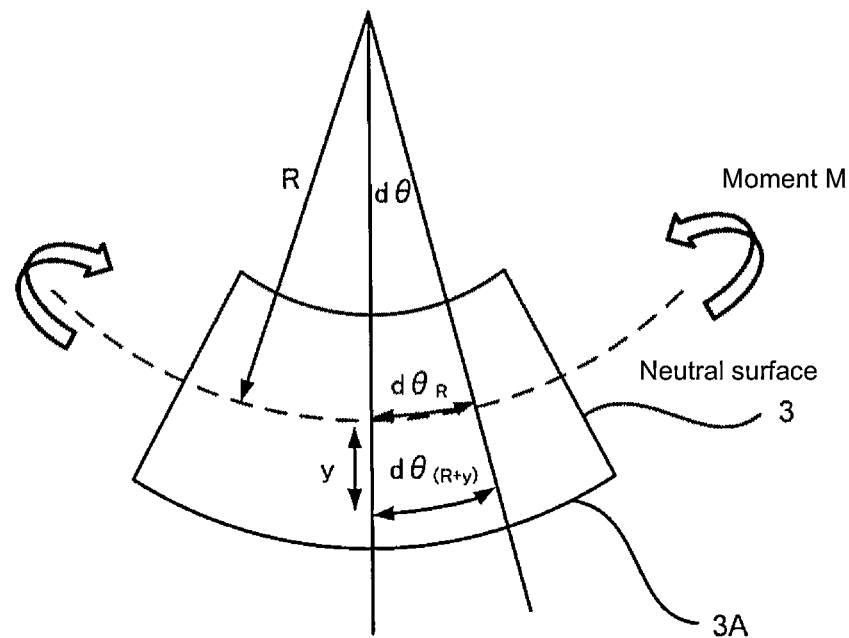
FIG. 3 is a schematic view illustrating a bending strain $\epsilon$.

The bending strain ε (%) at the electrode-side surface 3A of the flexible substrate, will be described by way of FIG. 3. FIG. 3 shows the flexible substrate 3 when the laminate 4 is bent so that the flexible substrate 3 side becomes concave. As shown in FIG. 3, the bending strain ε at the electrode-side surface 3A of the flexible substrate 3 is a strain that is generated at the electrode-side surface 3A of the flexible substrate 3 when the flexible substrate 3 (thickness t) is bent at a curvature radius R. The bending strain ε can be calculated by the following formula:

[Mathematical Formula 1]

$$\varepsilon = \frac{\left(\begin{array}{c}\text{Elongation of the electrode} - \text{side surface of the} \\ \text{substrate produced by bending the laminate}\end{array}\right)}{(\text{Size of the substrate before bending})} \times 100\%$$
$$= \frac{(d\theta_{(R+y)} - d\theta_R)}{d\theta \cdot R} \times 100\%$$
$$= y/R \times 100\%$$

At the electrode-side surface of the flexible substrate, the strain generated at the cross section of the flexible substrate is y=t/2. Therefore, the bending strain ε can be calculated by the following formula (1):

$$\varepsilon = t/2R \times 100\% \quad \text{Formula (1)}$$

It is clear from the formula (1) that the bending strain ε increases as the thickness t of the substrate increases or the curvature radius R of the same decreases. That is, the bending strain ε and thus the sheer stress τ can be controlled by controlling at least one of the thickness t and curvature radius R of the flexible substrate.

As the bending strain ε at the electrode-side surface of the flexible substrate increase, the sheer stress τ which acts on the interface between the flexible substrate and the electrode also increases. Therefore, from the viewpoint of preventing poor transfer, the bending strain ε is preferably 0.5% or more, and it is preferably as high as possible depending on the adhesion between the flexible substrate and the electrode.

From the formula (1), it is clear that parameters for determining the bending strain ε are only the thickness t and curvature radius R of the substrate, and even when a different material is used for the substrate, the bending strain ε thus generated remains the same as long as the thickness t and the curvature radius R remain the same. When a different material is used for the substrate, that is, when Young's modulus is different, the bending stress σ (i.e., ease of bending) varies in the case where there is no change in the bending strain ε thus generated.

The bending stress σ is represented by the following formula (2):

$$\sigma = E\varepsilon = Et/2R \quad \text{Formula (2)}$$

As described above, in the method for producing the membrane electrode assembly according to the present invention, it is possible to prevent removal of the electrode from the electrolyte membrane and peel the substrate from the electrode, even in the region where the adhesion between the substrate and the electrode is higher than the adhesion between the electrolyte membrane and the electrode; therefore, it is possible to prevent poor electrode transfer to the electrolyte membrane. Moreover, according to the production method of the present invention, the hot press condition used to hot press the electrolyte membrane and the electrode, for the purpose of increasing the adhesion between the electrolyte membrane and the electrode, is not needed to be a high temperature or pressure. Therefore, it is also possible to prevent the membrane electrode assembly from heat deterioration, by using a lower hot press temperature than in the past; it is also possible to control the electrode structure more easily, by using a lower hot press pressure than in the past; or it is also possible to prevent the electrolyte membrane from damage due to insertion of the electrode (e.g., CNT electrode) into the electrolyte membrane.

Hereinafter, the steps of the method for producing the membrane electrode assembly according to the present invention, will be described in detail.

[Hot Pressing Step]

The hot pressing step is a step in which the electrolyte membrane and the electrode, the electrode comprising the electroconductive material and the electrolyte resin and being formed on the flexible substrate, are hot pressed to produce the laminate in which the electrolyte membrane, the electrode and the flexible substrate are laminated in this order. The electrode and the electrolyte membrane are attached to each other by the hot pressing step.

(Flexible Substrate)

The flexible substrate is not particularly limited, as long as it has a flexibility and a thickness t, both of which can generate a desired sheer stress τ at the junction of the flexible substrate and the electrode in the bending step.

Concrete examples of the material for the flexible substrate include metal materials such as stainless-steel, iron, titanium, aluminum and copper, and resins such as polytetrafluoroethylene (PTFE) and polyimide (e.g., Kapton manufactured by DuPont). In the case of growing CNTs on the flexible substrate, since CNTs are generally grown under a high temperature condition, the flexible substrate is preferably made of a metal material. Particularly preferred are stainless-steel, iron, aluminum, etc.

As described above, the thickness t of the flexible substrate is such an important factor that generates the bending strain ε, which functions as a momentum for removal of the electrode and the flexible substrate from each other. The thickness t can be appropriately determined depending on the material of the flexible substrate, the adhesion between the electrode and the flexible substrate, the curvature radius R in the bending step of the flexible substrate, etc. In particular, the thickness t is preferably in the range of 1 to 500 μm, more preferably in the range of 5 to 100 μm, considering the following: as the thickness of the flexible substrate increases, the bending strain ε increases and results in the generation of a larger sheer stress τ; and in the case where the flexible substrate is made of a metal material, in the bending step, the handling property of the substrate is reduced when the substrate is too thick.

(Electrode)

On the flexible substrate, the electrode comprising at least the electroconductive material and the electrolyte resin is formed. The electrode can contain a catalyst that promotes electrode reaction.

The electroconductive material is needed to be electroconductive. Examples thereof include carbonaceous materials such as carbon nanotubes (CNTs), carbon nanofibers, carbon black, glassy carbon, acetylene black, carbon felt, carbon cloth and carbon paper; and particles and fibers comprising metals such as titanium oxide ($TiO_2$), tin oxide ($SnO_2$), palladium and alloys thereof, and particles and fibers comprising metal oxides of such metals.

Of them, from the viewpoint of reaction gas diffusivity, electron conductivity, specific surface area, catalyst metal diffusivity and so on of fuel cell electrodes, CNTs are preferred as a constituent material of fuel cell electrodes. Particularly preferred are CNTs aligned in an approximately vertical direction on the flexible substrate. Especially in the case of growing CNTs on the flexible substrate and then using the substrate as that for transfer, there are advantages such as simplification of production process, cost reduction, ease of controlling electrode structure, etc. Also, CNTs grown on the substrate in the manner described above, have high adhesion to the substrate. When the substrate for growing CNTs is also used as the flexible substrate for transfer, poor electrode transfer is likely to occur; therefore, it can be said that the production method of the present invention produces potent effects.

While having the advantageous as described above, the electrode comprising the CNTs aligned in an approximately vertical direction on the substrate, has such a problem that when hot pressed to the electrolyte membrane, the electrode is likely to cause excessive ingrowth into the electrolyte membrane and to penetrate the membrane. Therefore, according to the present invention which can decrease the hot press pressure (transfer pressure) applied to the electrolyte membrane and the electrode, even the electrode comprising the CNTs grown in an approximately vertical direction on the substrate, can be transferred to the electrolyte membrane, without causing the CNTs to penetrate the electrolyte membrane. Also, according to the present invention which can decrease the hot press pressure, it is also possible to transfer the electrode, maintaining sufficient pore characteristics and without collapsing the approximately vertical alignment of the CNTs on the flexible substrate. Moreover, according to the present invention, it is also possible to decrease the hot press temperature and to prevent the electrolyte membrane and the electrolyte resin covering the electrode surface from heat deterioration.

The CNTs aligned in an approximately vertical direction on the substrate mean that the angle made by the planar direction of the substrate and the tube length direction of the CNTs, is within the range of $90°±10°$. When the angle is within the range of $90°±10°$, similar effects to those of the case where the CNTs are aligned vertically ($90°$) can be obtained. The CNTs include linear and non-linear CNTs, and in the case of non-linear CNTs, the direction of a line joining the centers of the end surfaces of the tube length direction, is referred to as the tube length direction.

The electrolyte resin is needed to be able to conduct desired ions. For example, in the case of proton conductive electrolyte resin, there may be mentioned fluorine-based polymer electrolytes and hydrocarbon-based polymer electrolytes. Examples of fluorine-based polymer electrolytes include the following: perfluorocarbon sulfonic acid resins as typified by Nafion (product name, manufactured by Dupont), Aciplex (product name, manufactured by Asahi Kasei Corporation) and Flemion (product name, manufactured by Asahi Glass Co., Ltd.); and fluorine-containing polymer electrolytes such as a partly fluorinated polymer electrolyte, which is obtained by introducing a protonic acid group (proton conductive group) such as sulfonic acid group, sulfonimide group, carboxylic acid group, phosphate group, phosphonic acid group or phenolic hydroxyl group, in a copolymer of fluorocarbon vinyl monomer and hydrocarbon vinyl monomer or a polymer of difluoro vinyl monomer.

A hydrocarbon-based polymer electrolyte is a polymer electrolyte that contains no fluorine. Concrete examples thereof include the following: engineering plastics such as polyether ether ketone, polyether ketone, polyethersulfone, polyphenylene sulfide, polyphenylene ether and polyparaphenylene; and one obtained by introducing a protonic acid group (proton conductive group) such as sulfonic acid group, sulfonimide group, carboxylic acid group, phosphate group, phosphonic acid group or phenolic hydroxyl group, in a commodity plastic such as polyethylene terephthalate, polyethylene, polypropylene or polystyrene, and copolymers thereof.

The electrode can contain a component(s) other than the electroconductive material and the electrolyte resin. An example thereof is a catalyst. The catalyst is not particularly limited as long as it can promote electrode reaction. For example, as a catalyst for fuel cell electrodes, there may be mentioned metals such as platinum, ruthenium, iridium, rhodium, palladium, osmium, tungsten, lead, iron, chromium, cobalt, nickel, manganese, vanadium, molybdenum, gallium and aluminum, and alloys thereof. Preferably, the catalyst is carried on the surface of the electroconductive material.

The method for forming the electrode on the flexible substrate is not particularly limited.

For example, the electrode can be formed on the flexible substrate in the following manner: the flexible substrate is used as a substrate for growing CNTs; CNTs are grown in an approximately vertical direction on the substrate; a catalyst is carried on the surface of the CNTs; and the CNTs are covered with the electrolyte resin. The method for growing the CNTs on the substrate is not particularly limited and can be selected from conventionally known methods. For example, a catalyst that nucleates the growth of CNTs (e.g., a metal such as iron, nickel, cobalt or manganese) is carried on the flexible substrate by sputtering or the like, and CNTs can be grown by chemical vapor deposition (CVD) or the like, using the catalyst as the nucleus to grow CNTs. Examples of methods for carrying the catalyst on the CNTs surface include a method in which, in the case of platinum, a platinum salt solution is dropped to the CNTs surface on the substrate, dried and then subjected to reduction firing. Examples of methods for covering the CNTs surface with the electrolyte resin include a method in which an electrolyte resin solution is dropped to the catalyst-carrying CNTs and dried.

Also, there may be used a method in which CNTs grown by an arc discharge method, a laser deposition method, a flowing gas method or the like, are vertically aligned on the flexible substrate; a catalyst is carried on the CNTs surface; and the CNTs surface is covered with the electrolyte resin, thus forming the electrode.

Also, there may be used a method in which an electrode ink comprising the electrolyte resin and the catalyst-carrying electroconductive material, is applied onto the flexible substrate and dried. The solvent, application method and drying method of the electrode inks can be appropriately determined.

(Electrolyte Membrane)

The electrolyte membrane is needed to be able to conduct desired ions. For example, in the case of proton-conductive electrolyte membrane, there may be mentioned a membrane containing a fluorine-based polymer electrolyte and a membrane containing a hydrocarbon-based polymer electrolyte. The fluorine-based polymer electrolytes and the hydrocarbon-based polymer electrolytes are the same as those of the above-described electrolyte resin, which constitute the electrode, so that they will not be explained here. The electrolyte resin that constitutes the electrode can be the same as or different from the electrolyte resin that constitutes the electrolyte membrane.

The thickness of the electrolyte resin is not particularly limited. It is preferably in the range of 5 to 100 μm, for example.

(Hot Pressing Step)

The electrolyte membrane and the electrode formed on the flexible substrate are attached to each other by stacking and hot pressing them, thus forming the laminate.

The hot press condition is not particularly limited, as long as the electrolyte membrane can be attached to the electrode on the substrate.

In particular, the hot press temperature is preferably a temperature that is equal to or more than the softening point of the electrolyte membrane. For example, it is preferably about 100 to 150° C., depending on the type of the electrolyte resin that constitutes the electrolyte membrane.

The hot press pressure is preferably a pressure that attaches the electrolyte membrane, which is softened and in a semi-molten state, to the electrolyte resin in the electrode on the substrate, and also a pressure that does not allow the electroconductive material (e.g., CNTs) to penetrate the electrolyte membrane. From the viewpoint of preventing the penetration of the electroconductive material into the electrolyte and maintaining the electrode structure on the substrate, the hot press pressure is preferably as small as possible. For example, it is about 1 to 15 MPa.

The hot press time at the hot press temperature and pressure is preferably about 1 to 60 minutes, for example.

By cooling the laminate after the hot press, the electrolyte membrane is cured to fix the connection between the electrolyte membrane and the electrode. The connection can be more reinforced by cooling the laminate while maintaining the pressure applied upon the hot press.

Figure 5:
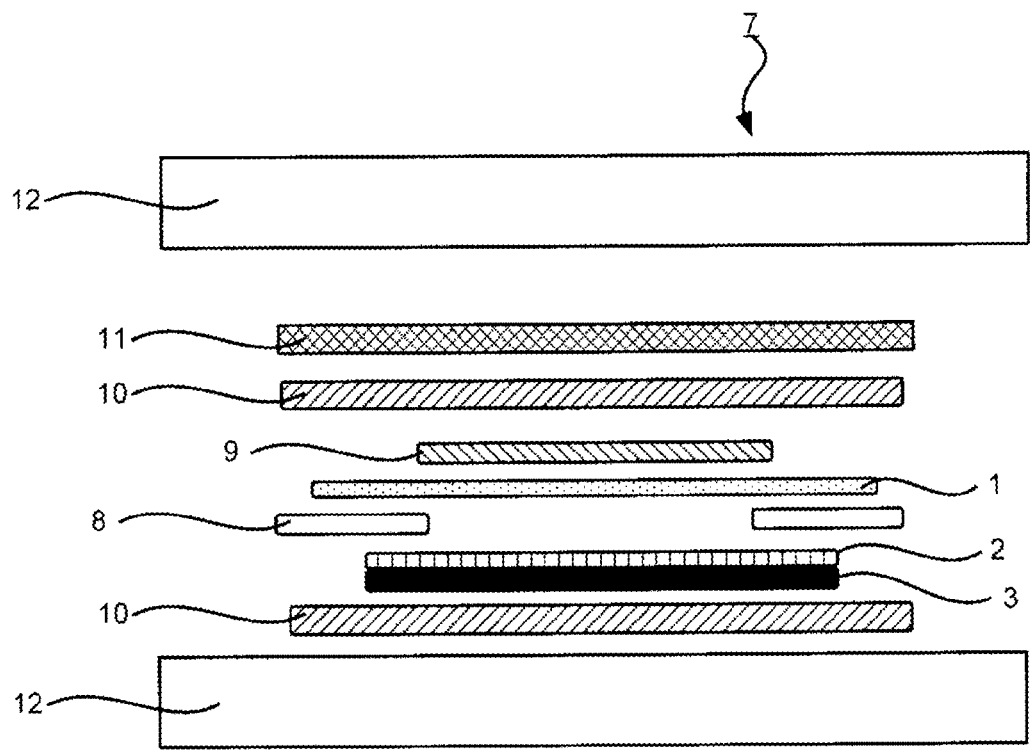
FIG. 5 is a schematic view of a jig used in the hot pressing step described under "Examples".

Examples of methods for transferring part of the electrode to the electrolyte membrane, the electrode being formed on the flexible substrate, include a method (1) in which, as shown in FIG. 5, the electrolyte membrane 1 is overlaid on the electrode 2 through a mask 8, the electrode being formed on the substrate 3 and the mask defining the size and shape of the electrode to be transferred, and they are hot pressed. To prevent that the thickness of the mask 8 affects and decreases the adhesion between the electrode 2 and the electrolyte membrane 1 upon the hot press, a spacer 9 can be provided between the electrolyte membrane 1 and a press surface 12 on the electrolyte membrane 1 side, the spacer having the same size and shape as those of the electrode to be transferred. Moreover, there may be mentioned a method (2) in which a block having the same size and shape as those of the electrode to be transferred, is used as a substrate-side press surface to hot press them.

FIG. 5 is a schematic view showing an embodiment of a jig that is used to hot press the electrolyte membrane and part of the electrode formed on the flexible substrate. A jig 7 can hot press the electrode 2 and the electrolyte membrane 1 by setting the electrolyte membrane 1 and the electrode 2, the electrode being formed on the flexible substrate 3, and hot pressing the entire jig 7 with a pressing machine.

The jig 7 shown in FIG. 5 can hot press the electrode 2, which is formed on the flexible substrate 3 and the electrolyte membrane 1, with the two press surfaces (for example, stainless-steel press surfaces) 12. As described above, the electrode 2 formed on the flexible substrate 3 and the electrolyte membrane 1 are stacked so that the mask 8 is present between the electrode 2 and the electrolyte membrane 1. To prevent that the thickness of the mask 8 affects and decreases the adhesion between the electrolyte membrane 1 and the electrode 2, the spacer 9 can be provided between the press surface 12 on the electrolyte membrane 1 side and the electrolyte membrane 1. The electrode 2, mask 8, electrolyte membrane 1 and spacer 9 on the substrate 3, can be sandwiched between restraint members 10 and restrained, the members being made of a sheet made from a heat resistant material (e.g., polytetrafluoroethylene). By restraining with the restraint members, the substrate 3, the electrode 2, the mask 8, the electrolyte membrane 1 and the spacer can be protected from contamination. To protect the electrolyte membrane 1, a cushioning material 11 can be provided on the electrolyte membrane-side press surface 12.

[Bending Step]

The bending step is a step in which the laminate produced by the hot pressing step is bent so that the flexible substrate side becomes concave (depressed), thereby removing the flexible substrate from the electrode.

The flexible substrate removal mechanism in the bending step is as described above. It has been also described above that the bending of the laminate is performed in the condition that allows the bending strain ε of the flexible substrate, which is represented by the formula (1), to be 0.5% or more.

In the bending step, as described above, when the laminate is bent, as the curvature radius R of the flexible substrate decreases, the bending strain ε generated on the electrode-side surface of the flexible substrate increases, so that the sheer stress τ generated at the junction of the flexible substrate and the electrode increases. However, when R is too small, there is a possibility of causing mechanical damage to the membrane electrode assembly itself. On the other hand, when R is too large, there is a possibility of applying an insufficient stress. Accordingly, the curvature radius R is preferably in the range of 1 to 100 mm. Particularly in the case where the flexible substrate used is one comprising a metal material having a thickness of 1 to 500 μm, the curvature radius R is preferably in the range of 1 to 10 mm.

Figure 4:
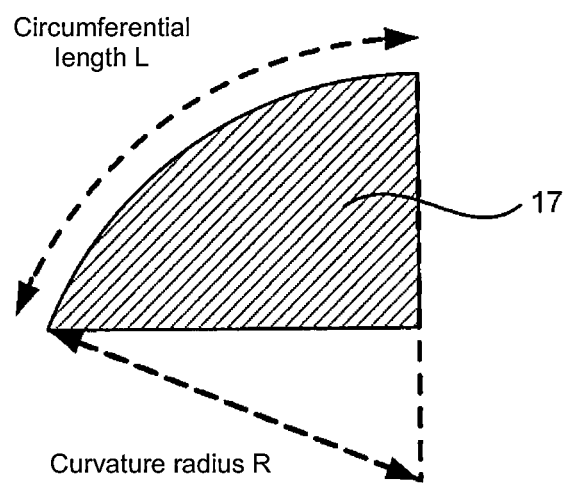
FIG. 4 is a view illustrating an example of the method of calculating a curvature radius R.

The curvature radius R can be obtained as follows, for example. In the case of a bending device 17 (angular device) as shown in FIG. 4, the device having a curved surface that has a circumferential length L, the curvature radius R can be obtained by measuring the circumferential length L and then calculating the curvature radius R according to the following equation: $R=L/2\pi$.

In the bending step, the laminate bending method is not particularly limited. It is preferably a method that can control the curvature radius R as described above.

A concrete example of the bending method is bending the laminate by pressing the flexible substrate side of the laminate to the angular device having a shape and size that can control the curvature radius R to be a desired value. By sliding the laminate across the angular device, which is in the state of being pressed to the angular device and bent, the laminate can be bent across the whole transfer region of the electrode, so that the sheer stress can be generated at the connection between the flexible substrate and the electrode. The laminate can be repeatedly slid across the angular device, until the sheer stress τ becomes larger than the adhesion between the flexible substrate and the electrode, and the flexible substrate is naturally removed from the electrode.

In the present invention, the case of transferring the electrode to one surface of the electrolyte membrane, is mainly explained. However, by the method for producing the membrane electrode assembly according to the present invention, the electrode can be transferred to both surfaces of the electrolyte membrane. In the case of the membrane electrode assembly obtained by transferring the electrode to, according to the production method of the present invention, one surface of the electrolyte membrane, an electrode can be formed on the other surface by a different method.

EXAMPLES

Hereinafter, the present invention will be explained further in detail, by way of Example 1 and Comparative Example 1. However, the present invention is not limited to these examples only.

Example 1

First, an electrode (CNT electrode formed on an SUS substrate) was prepared, comprising: CNTs aligned vertically on a surface of the SUS substrate (thickness 50 μm); platinum carried by the CNTs; and an electrolyte resin (DE2020-cs manufactured by DuPont) covering the CNTs surface. Also, an electrolyte membrane (Nafion 112 manufactured by DuPont, thickness 50 μm) was used.

Next, as shown in FIG. 5, the CNT electrode (CNT electrode 2) formed on the SUS substrate (SUS substrate 3) and the electrolyte membrane (electrolyte membrane 1) were set in a jig 7. The jig 7 was hot pressed with a pressing machine for 10 minutes at 140° C. and 10 MPa to hot press the CNT electrode and the electrolyte membrane. The thus-obtained laminate was cooled while it was kept at the same pressure. After cooling, the laminate was freed from the pressure.

The laminate composed of the SUS substrate, the CNT electrode and the electrolyte membrane was removed from the jig. The flexible substrate side of the laminate was pressed to an angular device which gives the SUS substrate a curvature radius R of 5 mm, thus generating a bending strain of ε=0.5% at the SUS substrate. The bending strain was generated all over the CNT electrode transfer region of the SUS substrate, by sliding the laminate across the angular device while the laminate was kept pressed to the angular device. The laminate was repeatedly pressed to the angular device, until the SUS substrate was naturally removed from the laminate, thus obtaining a membrane electrode assembly in which the electrolyte membrane and the CNT electrode were attached to each other.

Figure 6:
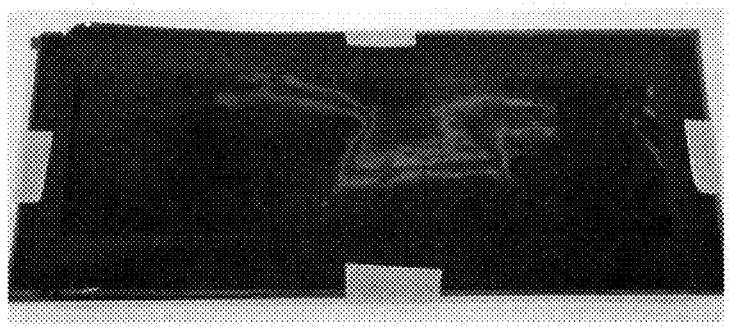
FIG. 6 is an image of the removed flexible substrate of Example 1.

FIG. 6 shows an image of the CNT electrode-side surface of the removed SUS substrate. The CNT electrode was not left on the SUS substrate, and the whole CNT electrode was transferred to the electrolyte membrane.

Figure 7:
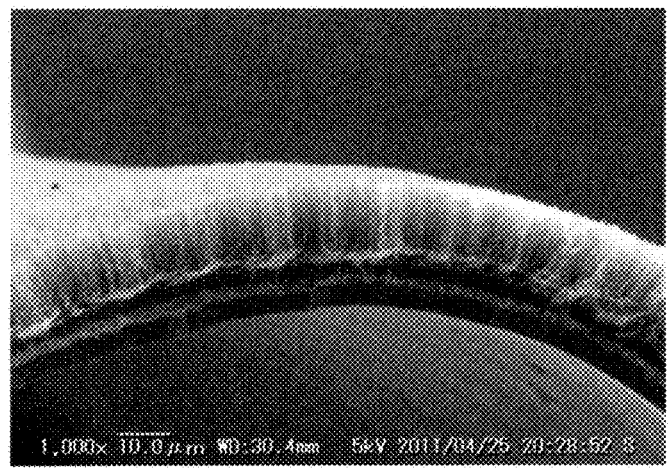
FIG. 7 is a cross-sectional SEM image of the membrane electrode assembly of Example 1, after removal of the flexible substrate.

FIG. 7 shows a cross-sectional SEM image of the thus-obtained membrane electrode assembly. As shown in FIG. 7, it has been confirmed that the CNTs were transferred to the electrolyte membrane, maintaining the vertical structure thereof, without any collapse.

Comparative Example 1

In the same manner as Example 1, the electrolyte membrane and the CNT electrode formed on the SUS substrate were hot pressed, cooled while being kept at the same pressure, and then freed from the pressure after cooling.

The laminate composed of the SUS substrate, the CNT electrode and the electrolyte membrane was removed from the jig. The electrolyte membrane was removed from the SUS substrate, pulling the membrane in an approximately vertical direction, without performing the bending step.

Figure 8:
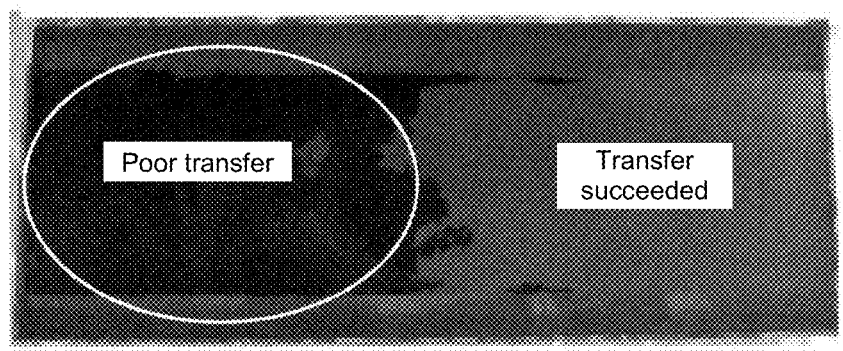
FIG. 8 is an image of the removed flexible substrate of Comparative Example 1.

FIG. 8 shows an image of the CNT electrode-side surface of the removed SUS substrate. As shown in FIG. 8, it has been confirmed that in a circled region, the CNT electrode was not transferred to the electrolyte membrane and left on the SUS substrate. It is thought that in this region, the adhesion between the CNT electrode and the SUS substrate is larger than the adhesion between the electrolyte membrane and the CNT electrode and resulted in poor transfer.

(Study of Bending Strain ε)

A membrane electrode assembly was produced in the same manner as Example 1, except that the SUS substrate was removed from the laminate by using angular devices having different curvature radii.

The curvature radii of the angular devices were 8.3 mm, 5.0 mm, 3.1 mm, 2.1 mm and 1.6 mm so that the bending strains generated on the CNT-side electrode surface of the SUS substrate were 0.3%, 0.5%, 0.8%, 1.2% and 1.6%, respectively.

The CNT electrode transfer state to the electrolyte membrane was confirmed. The results are shown in Table 1. In Table 1, "○" indicates that the CNTs were not left on the substrate after transfer (transfer was carried out successfully), while "x" indicates that the CNTs were left on part of the substrate after transfer.

TABLE 1

| | ε (%) | | | | |
|---|---|---|---|---|---|
| | 0.3 | 0.5 | 0.8 | 1.2 | 1.6 |
| Result of transfer | X | ○ | ○ | ○ | ○ |

As shown in Table 1, it has been confirmed that the bending strain is preferably 0.5% or more in the removal step. As described above, the bending strain ε does not depend on the material of the substrate. By setting the bending strain ε to, regardless of the material of the substrate, 0.5% or more, poor transfer from the CNT substrate to the electrolyte membrane is prevented.

REFERENCE SIGNS LIST

1. Electrolyte membrane
2. Electrode
3. Flexible substrate
4. Laminate
5. Carbon nanotube
6. Electrolyte resin
7. Jig
8. Mask
9. Spacer
10. Restraint member
11. Cushioning material
12. Press surface
13. Membrane electrode assembly
14. Gas diffusion layer
15. Separator
16. Gas channel
17. Bending device
100. Unit fuel cell

The invention claimed is:
1. A method for producing a membrane electrode assembly, the assembly comprising an electrolyte membrane and an electrode which are attached to each other,
the method comprising:
a hot pressing step in which an electrolyte membrane and an electrode, the electrode comprising an electroconductive material and an electrolyte resin and being formed on a flexible substrate, are hot pressed to pro- duce a laminate in which the electrolyte membrane, the electrode and the flexible substrate are laminated in this order, and a bending step in which the laminate is bent so that the flexible substrate side becomes concave, thereby removing the flexible substrate from the electrode, wherein, in the bending step, the laminate is bent in a condition which gives the flexible substrate a bending strain $\epsilon$ of 0.5% or more, the bending strain being represented by the following formula (1):

$$\epsilon = t/2R \times 100\% \qquad \text{Formula (1)}$$

t=Thickness of flexible substrate
R=Curvature radius of flexible substrate.

2. The method for producing the membrane electrode assembly according to claim 1, wherein the electroconductive material is carbon nanotubes grown on the flexible substrate.

3. The method for producing the membrane electrode assembly according to claim 1, wherein the electroconductive material is carbon nanotubes aligned in an approximately vertical direction on the flexible substrate.

4. The method for producing the membrane electrode assembly according to claim 1, wherein the flexible substrate comprises a metal material and has a thickness of 1 to 500 μm, and the curvature radius R of the flexible substrate is 1 to 10 mm in the bending step.

* * * * *